United States Patent [19]
Huck et al.

[11] Patent Number: 5,517,651
[45] Date of Patent: May 14, 1996

[54] METHOD AND APPARATUS FOR LOADING A SEGMENT REGISTER IN A MICROPROCESSOR CAPABLE OF OPERATING IN MULTIPLE MODES

[75] Inventors: Kamla Huck, Portland; Andrew F. Glew; Scott D. Rodgers, both of Hillsboro, all of Oreg.

[73] Assignee: Intel Corporation, Santa Clara, Calif.

[21] Appl. No.: 174,714

[22] Filed: Dec. 29, 1993

[51] Int. Cl.$^6$ .......................................................... G06F 9/42
[52] U.S. Cl. ........................................... 395/775; 395/375
[58] Field of Search .................................. 395/775, 325, 395/400, 425, 406, 481, 375

[56] References Cited

U.S. PATENT DOCUMENTS

| | | | |
|---|---|---|---|
| 4,430,706 | 2/1984 | Sand ......................................... | 395/375 |
| 4,442,484 | 4/1984 | Childs, Jr. et al. ...................... | 395/425 |
| 5,125,087 | 6/1992 | Randell .................................... | 395/425 |
| 5,136,697 | 8/1992 | Johnson ................................... | 395/375 |
| 5,144,551 | 9/1992 | Cepulis ..................................... | 395/425 |
| 5,367,658 | 11/1994 | Spear et al. ............................ | 395/425 |
| 5,404,470 | 4/1995 | Miyake .................................... | 395/375 |

OTHER PUBLICATIONS i486 Microprocessor Programmer's Reference Manual; a publication of Intel Corporation; Osborne McGraw–Hill, 1990.

IEEE Micro, Published Jun., 1991, pp. 10–13, and 63–73, Authors: Val Popescu, et al, Entitled: The Metaflow Architecture.

Superscolan Microprocessor Design, Mike Johnson, 1991, pp. 126–147, 278–288.

*Primary Examiner*—Jack B. Harvey
*Assistant Examiner*—Paul R. Myers
*Attorney, Agent, or Firm*—Blakely, Sokoloff, Taylor & Zafman

[57] ABSTRACT

A microprocessor contains an address generation unit, including a segment block, for loading descriptor data and a segment selector in a segment register. Two descriptor loads from a global descriptor table (GDT) and a local descriptor table (LDT) are executed. A 64 bit global descriptor from the GDT is loaded into a temporary register, and a 64 bit local descriptor from the LDT is also loaded into a separate temporary register. If a table indicator bit in the segment selector indicates use of the GDT, then the descriptor data from the GDT is selected. Alternatively, if the table indicator bit in the segment selector indicates the use of the LDT, then the descriptor data from the LDT is selected. The segment block splits the 64 bit descriptor data selected into two 32 bit quantities. The two 32 bit data quantities are input to a test programmable logic array (PLA). The test PLA checks for permission violations, or faults, and detects the need for special handling of the register segment load operation. If a fault violation occurs, the segment block signals a fault exception. If no fault is detected, then the segment block loads the two 32 bit descriptor data segments, along with the selector, into the appropriate segment register. If special handling is required, a conditional indirect branch is utilized to reach the handler.

39 Claims, 10 Drawing Sheets

METHOD AND APPARATUS FOR LOADING A SEGMENT REGISTER IN A MICROPROCESSOR CAPABLE OF OPERATING IN MULTIPLE MODES

FIELD OF THE INVENTION

The present invention relates to memory segmentation in a microprocessor memory address generation unit, and more specifically to methods and apparatus for loading a segment register in a microprocessor capable of operating in multiple modes.

BACKGROUND OF THE INVENTION

Advances in silicon process technology has lead to the development of increasingly larger die sizes for integrated circuits, which are capable of including millions of transistors on a single die. In turn, the ability to integrate such a high number of transistors on a single die has not only led to invention of the microprocessor, but has also led to the improvement of microprocessor features and permitted an increase in the number of features available.

In order to utilize a microprocessor in a computer system, an operating system, compatible with the microprocessor, is developed. In addition to providing a compatible operating system, application programs are developed. For the Intel® architecture microprocessor, a large number of application programs compatible with the Intel® architecture microprocessor are readily available. Consequently, for the Intel® architecture microprocessor, many application programs have been written to remain compatible with earlier versions of the microprocessor. However, it is desirable to take advantage of the large integration of transistors by increasing the functionality of the microprocessor.

In order to remain compatible with certain existing software applications and to provide increased functionality, the Intel® architecture microprocessor developed operating modes. The operating modes in the Intel® architecture microprocessor include a real mode, a protected mode, and a virtual 8086 mode operating within the protected mode. The real mode of the Intel® architecture microprocessor permits compatibility with previous system software versions while the protected mode provides a variety of features for newer applications. The virtual 8086 mode permits compatibility with older application programs in a new operating system environment.

As the number of operating modes and functionality in a particular microprocessor increases, the complexity to implement functions within the microprocessor also increases. For example, for the Intel® architecture microprocessor, generating an address for memory may require three different operations, one for each operating mode. In such a case, the complexity of the microprocessor is increased by three. Therefore, it is desirable to implement functions in a microprocessor that overlap operations regardless of the operating mode of the microprocessor. By overlapping certain functions applicable to all operating modes, the complexity of the microprocessor, including the number of micro-instructions, and transistors is decreased.

SUMMARY OF THE INVENTION

The present invention provides methods and apparatus for loading a segment register. A microprocessor contains an address generation unit, including a segment block, for loading a segment selector and, in certain modes, descriptor data in a segment register. The segment selector is transferred to the segment block. Two descriptor loads, one from a global descriptor table (GDT) and one from a local descriptor table (LDT), are executed. The segment block masks the segment selector such that the upper thirteen bits of the segment selector are utilized as an index into the local descriptor table or the global descriptor table. The segment block determines whether the selector is a global selector or local selector by examining a table indicator bit in the segment selector, cancels the memory operation not required, and sets a flag to indicate the operation canceled. Consequently, either a 64 bit global descriptor from the GDT is loaded into a temporary register if the selector is global, or a 64 bit local descriptor from the LDT is loaded into a separate temporary register if the selector is local. If the flag set indicates use of the GDT, then the descriptor data from the GDT is selected. Alternatively, if the flag set indicates the use of the LDT, then the descriptor data from the LDT is selected. In a preferred embodiment, a conditional select microinstruction is executed to select the GDT or LDT data based on the state of the flag.

The segment block splits the 64 bit descriptor data selected into two 32 bit quantities. The two 32 bit data quantities are input to a test programmable logic array (PLA). The test PLA comprises a fault PLA and a branch PLA. The fault PLA receives the selector and descriptor data and checks for permission violations, or faults. If a fault violation occurs, the segment block signals a fault. In addition, the descriptor load operation is terminated Alternatively, if no fault is detected, then the segment block loads the two 32 bit descriptor data segments, along with the selector, into the appropriate segment register.

The selector and two 32 bit descriptor data quantities are also input to the branch PLA. The branch PLA detects the need for special handling of the segment loaded. If special handling is required, the branch PLA returns a micro instruction pointer identifying the appropriate handler in microcode, and sets a valid flag in a result register to indicate generation of the microcode handler address. A conditional indirect branch is subsequently utilized to reach the handler.

BRIEF DESCRIPTION OF THE DRAWINGS

The objects, features, and advantages of the present invention will be apparent from the following detailed description of the preferred embodiment of the invention with references to the following drawings.

NOTION AND NOMENCLATURE

Figure 1:
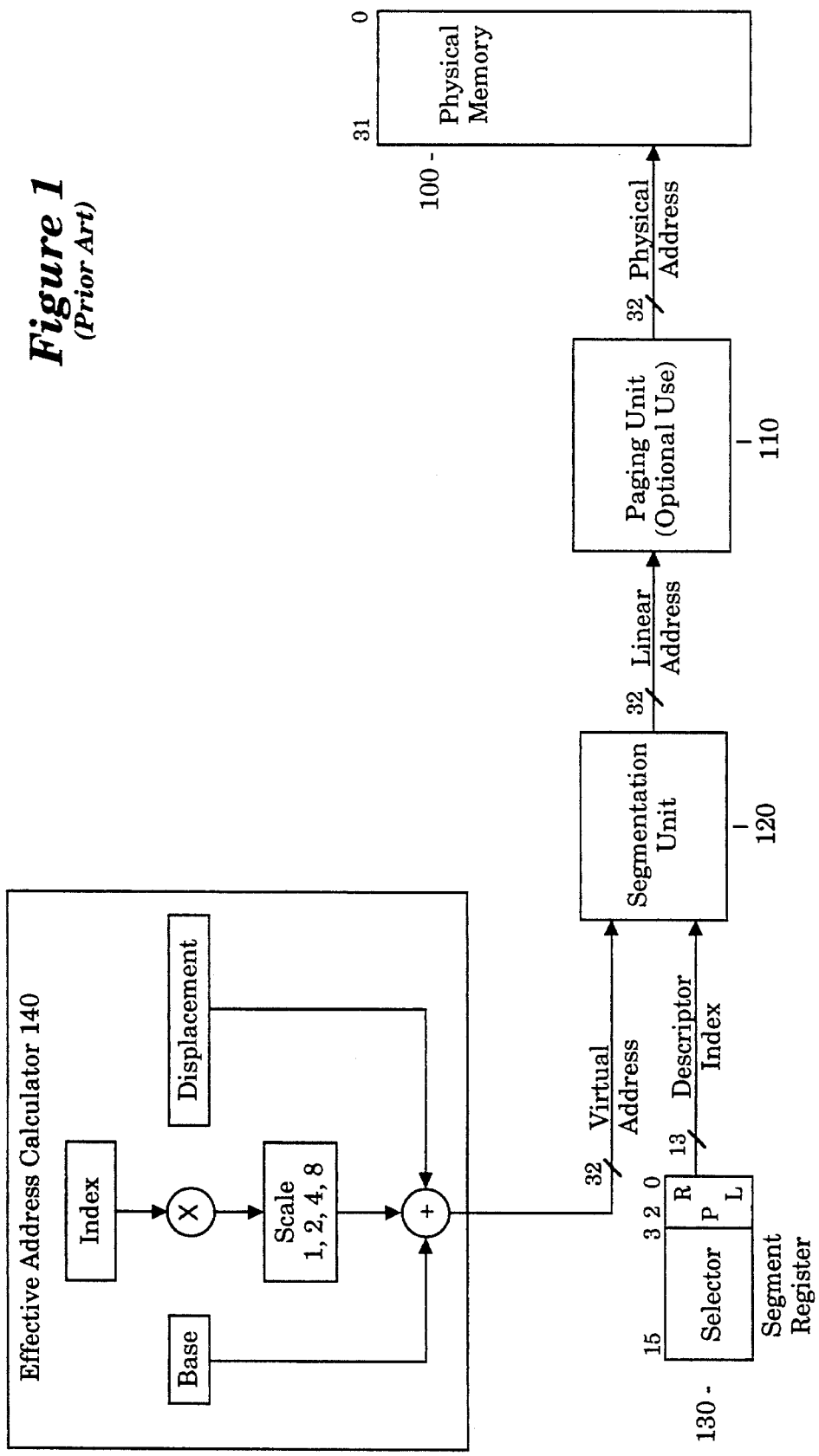
FIG. 1 illustrates a high level block diagram for address translation in an Intel® architecture microprocessor.

The detailed descriptions which follow are presented largely in terms of algorithms and symbolic representations of operations within a computer system. These algorithmic descriptions and representations are the means used by those skilled in the data processing arts to convey the substance of their work most effectively to others skilled in the art.

Generally, and within the context of this application, an algorithm is conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, a distinction is maintained between the method operations in operating a computer and the method of computation itself. The present invention relates to method steps for operating a computer in processing electrical or other physical signals (e.g., mechanical, chemical) to generate other desired physical signals.

The present invention also relates to apparatus for performing these operations. This apparatus may be specially constructed for the required purposes, or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION

Methods and apparatus for loading a segment register for an Intel® architecture microprocessor are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

The present invention includes a segmentation unit within a memory management unit for an Intel® architecture microprocessor. In general, the memory management unit (MMU) contains the segmentation unit and a paging unit. Segmentation allows management of the logical address space by providing data and code relocatability and efficient sharing of global resources. The paging unit operates beneath segmentation and is transparent to the segmentation process. For the Intel® architecture microprocessor, memory is organized into one or more variable length segments, each comprising up to four gigabytes in size. The segmented memory space may be divided into one or more pages. Typically, each segment stores information containing common attributes such as location, size, type (i.e. stack, code or data) and protection characteristics. The segmentation unit provides four levels of protection for isolating and protecting application programs and the operating systems from conflict in the address space. The Intel® architecture microprocessor hardware enforced protection allows the design of systems with a high degree of integrity.

In general, the Intel® architecture microprocessor operates in two modes: real address mode (real mode) and protected mode virtual address mode (protected mode). In real mode, the Intel® architecture microprocessor is compatible with the 8086 Intel® microprocessor. For new applications, real mode is used primarily to set up the Intel® architecture microprocessor for protected mode operation. Protected mode provides access to the sophisticated memory management segmentation, paging, and privilege capabilities of the Intel® architecture microprocessor. When operating in protected mode, application programs can execute a task switch to enter into tasks designated as Virtual 8086 mode tasks. Each Virtual 8086 mode task operates with 8086 semantics, allowing Intel® 8086 compatible software to execute on the Intel® architecture microprocessor under an operating system running in protected mode.

The Intel® architecture microprocessor contains three distinct address spaces: logical, linear and physical. A logical address, or virtual address, consists of a selector and an offset. The selector is stored in a segment register. An offset is formed by summing all of the addressing components (base, index, displacement) into an effective address. Referring to FIG. 1, a high level block diagram for address translation in an Intel® architecture microprocessor is illustrated. FIG. 1 illustrates the generation of a physical address for a physical memory 100. The effective address calculator 140 generates the virtual or logical address. A segment register 130 stores the contents of the selector and, in protected mode, a descriptor containing type, base limit and protection information. The effective address calculator 140 and the segment register 130 are coupled to a segmentation unit 120. The segmentation unit 120 translates the logical address space into a linear address space. An embodiment for the segmentation unit configured in accordance with the present invention is described further below. If paging is utilized in the Intel® architecture microprocessor, then the linear address is input to the paging unit 110. The paging unit 110 translates the linear address space into the physical address space. The physical address is transmitted to the physical memory 100 to access to the memory. If the paging unit 110 is disabled, then the linear address corresponds to the physical address.

Protected mode segmentation provides the basis for software address protection in the Intel® architecture microprocessor. Segments are utilized to encapsulate regions of memory that have common attributes. For example, all of the code for a given application program may be contained in a single segment, or an operating system table may reside in a single segment. All information corresponding to a segment is stored in an 8 byte data structure called a descriptor. All of the descriptors for a particular system are contained in tables for recognition by the Intel® architecture microprocessor. The descriptor tables define all of the segments that are used in an Intel® architecture microprocessor system. The Intel® architecture microprocessor utilizes three tables that store descriptors: the global descriptor table, the local descriptor table and the interrupt descriptor table. All of the descriptor tables are variable length memory arrays. The upper 13 bits of a selector are used as an index into the descriptor table. The tables comprise registers that store the 32 bit linear base address and the 20 bit limit of each table.

The Intel® architecture microprocessor stores a pointer, in a global descriptor table register (GDTR), that points to the global descriptor table, and stores a pointer, in a local descriptor table register (LDTR), that points to the local descriptor table. In addition, The Intel® architecture microprocessor stores a pointer, in a interrupt descriptor table register (IDTR), that points to an interrupt descriptor table (IDT). A LLDT macro instruction for the Intel® architecture microprocessor loads selectors and descriptors for the local descriptor table. A LGDT and LIDT load the base and limit of the global and interrupt descriptor tables, respectively, into the appropriate register. The SGDT, and SIDT store the base and limit values, and the SLDT stores the selector. The global descriptor table contains descriptors that are available to all tasks in the system. The global descriptor table may contain any type of segment descriptor except for descriptors that are used for servicing interrupts. Generally, the global descriptor table contains code and data segments, used by the operating system and task state segments, and descriptors for the local descriptor tables in the system. The global descriptor table may also contain gates used to permit user code to invoke selected operating system routines through a protected interface.

The local descriptor tables contain descriptors that are associated with a given task. Generally, operating systems are designed so that each task contains a separate local descriptor table. The local descriptor table may contain only code, data, stack, task gate, and call gate descriptors. Local descriptor tables provide a mechanism for isolating code and data for a corresponding task and other tasks operating within the operating system. In contrast, the global descriptor table contains descriptors for segments that are common to all tasks. A segment cannot be accessed by a task if the corresponding segment descriptor does not exist in either the current local descriptor table or the current global descriptor table. The portion of the local descriptor table register visible to the user contains a 16 bit selector. The 16 bit selector indexes the local descriptor table descriptor located in the global descriptor table.

Figure 2A:
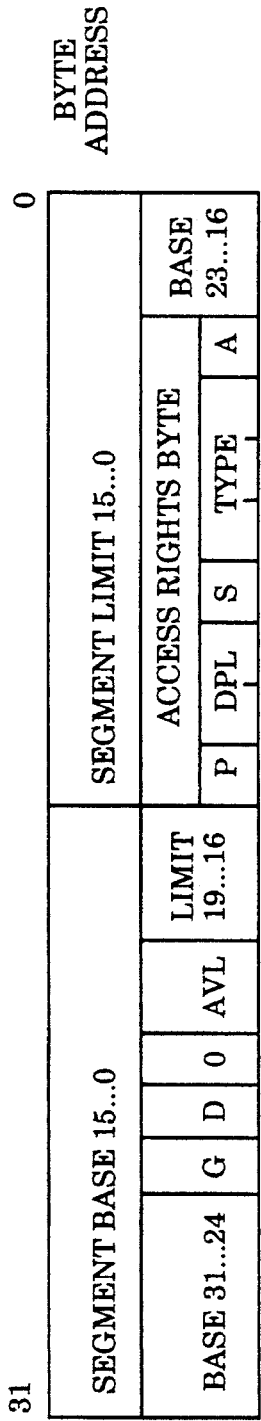
FIG. 2a illustrates a format for a memory segment descriptor configured in accordance with the Intel® architecture microprocessor.

As discussed above, each segment selector indexes a descriptor table to specify a particular descriptor. Descriptors are 8 byte quantities that contain attributes about a given segment. Referring to FIG. 2a, a format for a memory segment descriptor configured in accordance with the Intel® architecture microprocessor is illustrated. As shown in FIG. 2a, a segment descriptor includes a 32 bit segment base and a 20 bit segment limit. The segment access rights byte includes protection level bits, read, write or execute privileges, default size of the operands (16 bit or 32 bit), and the type of segment. All segments have three attribute fields in common: the P-bit, the descriptor privilege level (DPL) bits, and the S-bit. The present bit, or P-bit, is set to 1 if the segment is loaded in linear memory. Alternatively, if the P-bit is not set, then any attempt to access the segment causes a segment not present exception.

The DPL contains a two bit field that specifies the protection level associated with the corresponding segment. The Intel® architecture microprocessor provides four hierarchical privilege or protection levels. The privilege levels range from 0–3 such that level 0 represents the highest privilege level, and level 3 represents the lowest privilege level. The Intel® architecture microprocessor contains two main categories of segments: system segments and non-system segments (for code and data). The segment S-bit and the segment descriptor identifies a segment as a system segment or a code/data segment. If the S-bit is set, then the segment is either a code or a data segment. If the S bit is not set, then the segment is a system segment. The base of the segment descriptor provides the base address of the segment, and the limit indicates the length of the segment. In addition, the "A" bit represents the access bit, the "G" bit is the granularity bit that indicates whether the limit indicates the number of bytes or the number of 4 kilobyte blocks in the segment, and the "D" bit is the default operation size.

Figure 2B:
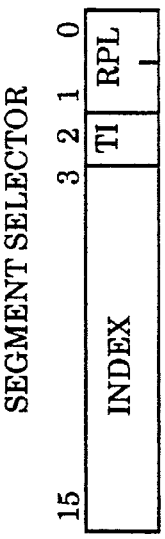
FIG. 2b illustrates a format for a segment selector configured in accordance with the Intel® architecture microprocessor.

As shown in the segment selector format illustrated in FIG. 2b, the segment selector in protected mode contains three fields: the descriptor table entry index (INDEX), the table indicator (TI), and the requester privilege level (RPL). The TI bit selects either the global descriptor table or the local descriptor table. The INDEX selects one of the segment descriptors in the appropriate descriptor table. The RPL bits allow high speed testing of the selectors privilege attributes. The Intel® architecture microprocessor contains a segment descriptor register corresponding to each segment register. Whenever the contents of a segment register are changed, the segmentation unit loads the corresponding 8 byte descriptor into the descriptor register. The descriptor register provides accessibility for subsequent operations.

The segment selectors are stored in six 16 bit segment registers. In protected mode, each segment may range in size from 1 byte up to the entire linear and physical address range of the microprocessor. In real mode, the maximum segment size is fixed at 64 kilobytes. The six addressable segments are defined by the segments registers: CS, SS, DS, ES, FS, and GS. The selector in CS register indicates the current code segment; the selector in SS indicates the current stack segment; and the selectors in DS, ES, FS and GS indicate the current data segments. Each descriptor register holds a 32 bit base address, a 32 bit segment limit, and additional segment attributes. When a selector value is loaded into a segment register, the associated descriptor register is updated with the correct information. In real address mode, only the base address is updated directly by shifting the selector value 4 bits to the left. In protected mode, the base address, the limit, and the segment attributes are updated based the contents of the segment descriptor. Whenever a memory reference occurs, the segment descriptor register corresponding to the segment register accessed is involved with the memory reference. The 32 bit segment base address becomes a component of the linear address calculation, and the 32 bit limit is utilized to insure that the access does not require data located beyond the end of the segment.

Figure 2C:
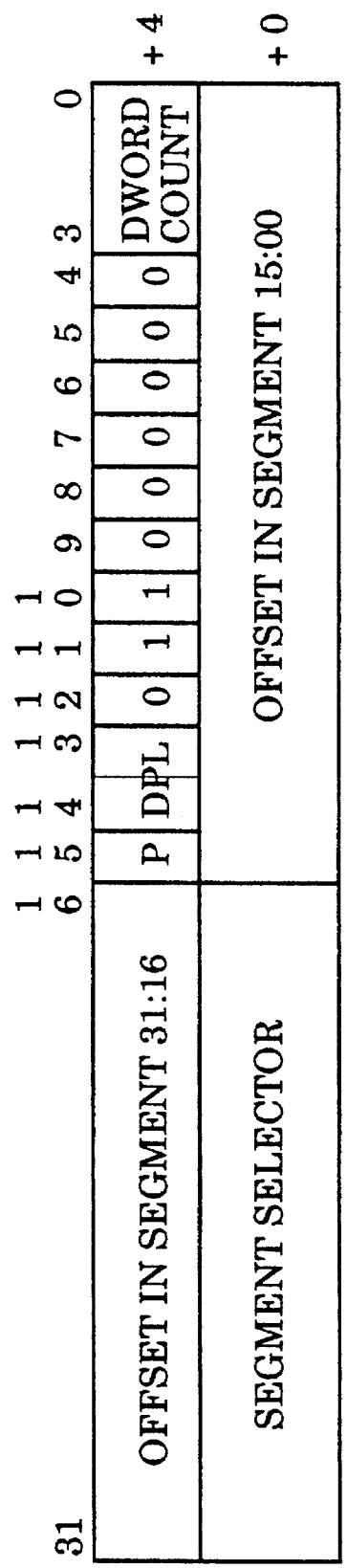
FIG. 2c illustrates a format for a gate segment descriptor configured in accordance with the Intel® architecture microprocessor.

In order to provide protection for control transfer among executable segments at different privilege levels, the Intel® architecture microprocessor utilizes gate descriptors. The gate descriptors consist of four types: call gates, trap gates, interrupt gates, and task gates. In general, call gates are utilized for control transfers between different privilege levels. FIG. 2c illustrates the format of a call gate in an Intel® architecture microprocessor. The call gate descriptors are used by CALL and JUMP instructions in the same manner as code segment descriptors. When the hardware recognizes that the segment selector for the destination refers to a gate descriptor, the operation of the instruction is determined by the contents of the call gate. A call gate descriptor may reside in the GDT or in an LDT, but not in the interrupt descriptor table (IDT).

The selector and offset fields of a call gate form a pointer to the entry point of a procedure. A call gate guarantees that all control transfers to other segments got to a valid entry point, rather than to the middle of a procedure (or worse, to the middle of an instruction). The operand of the control transfer instruction is not the segment selector and offset within the segments to the procedure's entry point. Instead, the segment selector points to a gate descriptor, and the offset is not used. The privilege levels are used to check the validity of a control transfer through a call gate.

Figure 3:
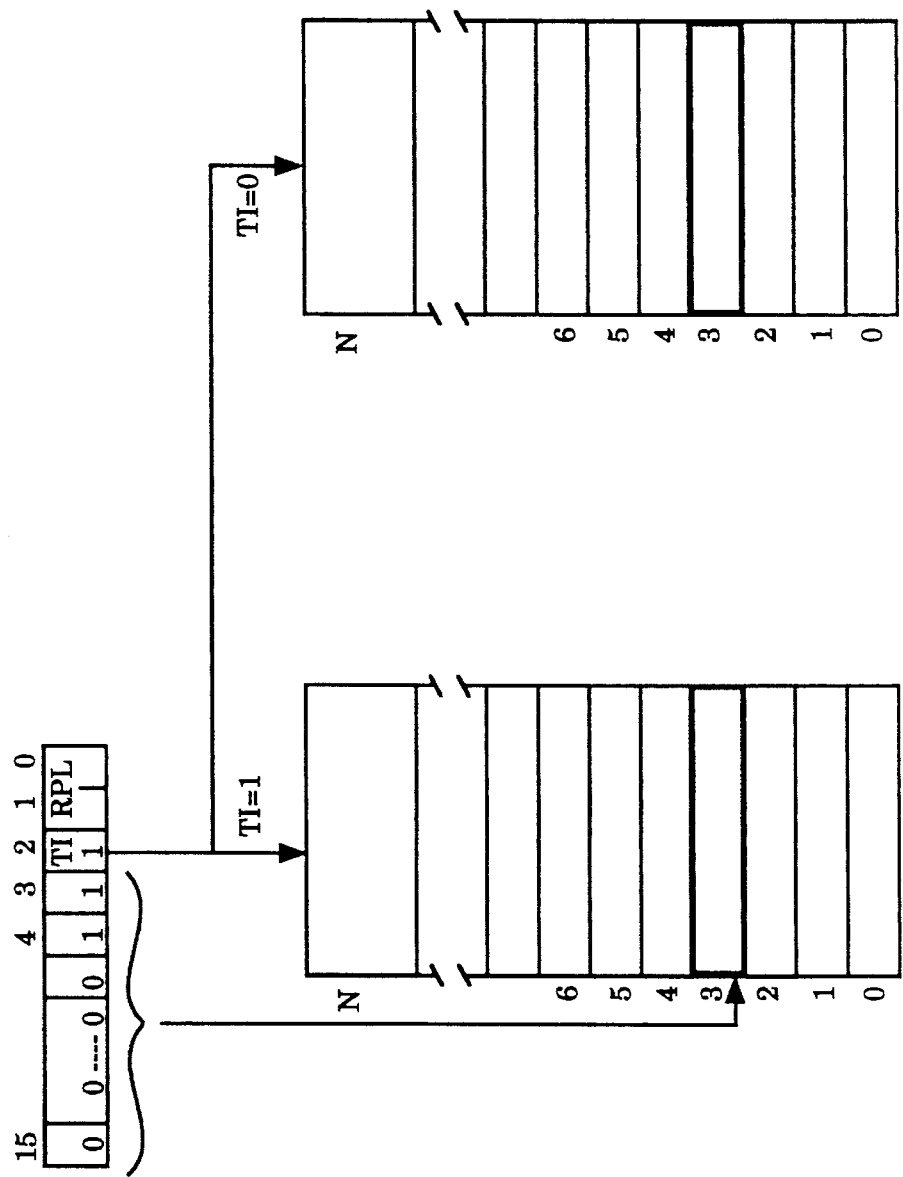
FIG. 3 illustrates an example of a selector indexing a local or global descriptor table for the Intel® architecture microprocessor.

Referring to FIG. 3, an example of indexing a local and global descriptor with a segment selector for the Intel® architecture microprocessor is illustrated. For the example shown in FIG. 3, the table indicator is set to select the local descriptor table. In addition, the index for the segment register selects the third descriptor in the local descriptor table.

Figure 4:
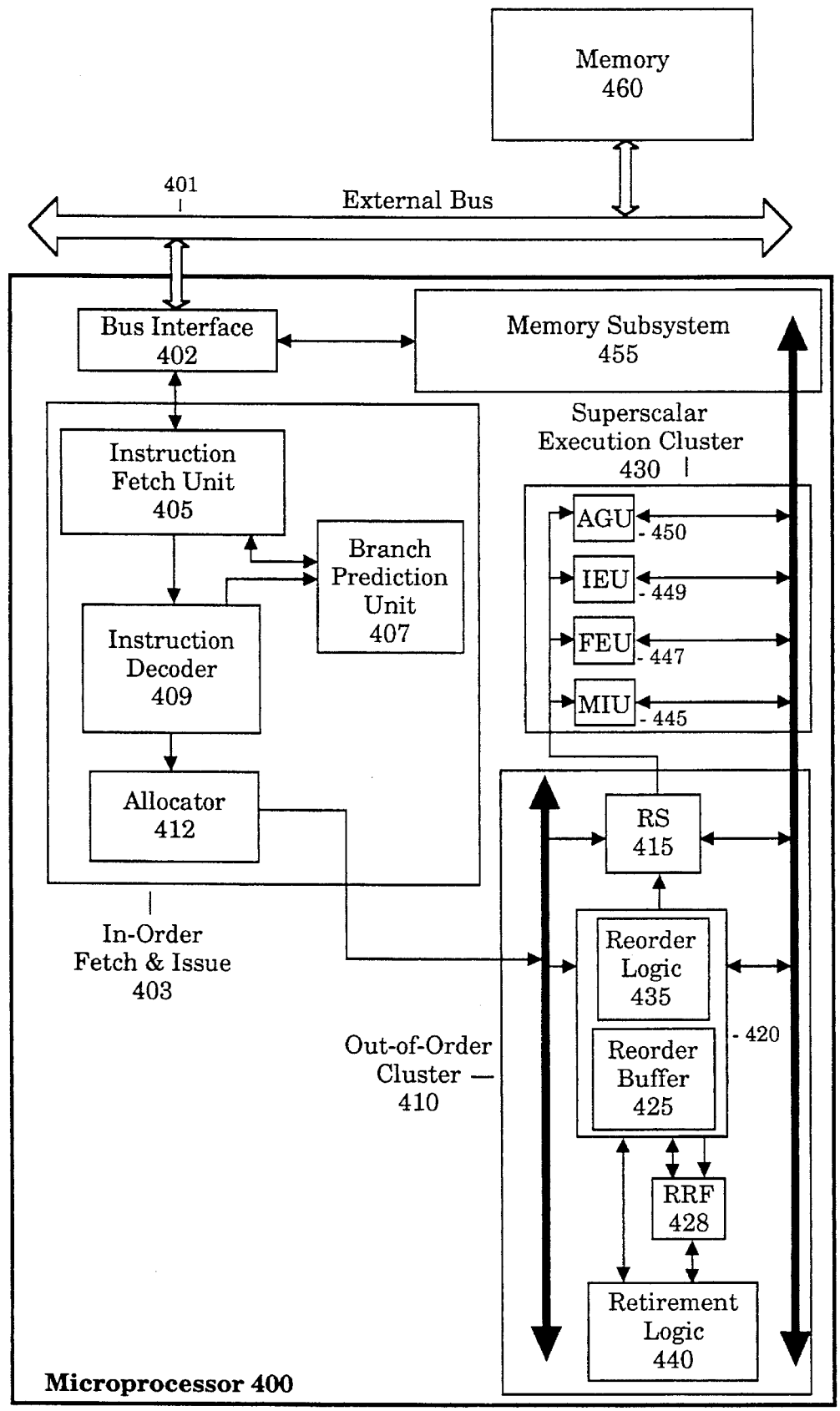
FIG. 4 illustrates a microprocessor incorporating the teachings of the present invention.

The present invention has application for use in a microprocessor employing memory segmentation. Referring to FIG. 4, a high level block diagram of an out-of-order superscaler microprocessor 400 incorporating the memory segmentation unit of the present invention is illustrated. FIG. 4 illustrates functional blocks of a superscaler pipelined microprocessor of the present invention. The microprocessor 400 contains an in-order fetch and issue cluster 403, an out-of-order cluster 410, and a superscalar execution cluster 430. In addition, microprocessor 400 contains a bus interface 402, coupled to an external bus 401, and a memory subsystem 455 for interfacing the microprocessor 400 to an external memory 460.

The bus interface 402 interfaces the microprocessor 400 to peripheral components, including the memory 460, via the external bus 401. The memory subsystem 455 is coupled to the bus interface 402 and provides a memory interface to cache memory and main memory. In one embodiment, the bus interface 402 attempts to load or store data from a high speed cache memory. Alternatively, the bus interface 402 accesses a main memory over the external bus 401. The bus interface 402 is intended to represent a broad category of interface devices which are well known in the art and will not be described further.

The bus interface 402 is coupled to a instruction fetch unit 405 located in the in-order fetch & issue cluster 403. The instruction fetch unit 405 retrieves microprocessor instructions, known as macro instructions, and operand location information for execution in the microprocessor 400. In a preferred embodiment, the microprocessor 400 is implemented as a pipelined processor so as to overlap the operation of instruction fetch, instruction decode and instruction execute. The instruction fetch unit 405 continually fetches macro instructions for the pipeline in the microprocessor 400. However, simple unconditional branch instructions within the instruction stream prevent the instruction fetch unit 405 from retrieving instructions in a purely sequential path. Furthermore, conditional branch instructions, within the instruction stream, prevent the instruction fetch unit 405 from retrieving instructions along a predetermined path because the condition requires resolution to ascertain the path.

In order to continually input macro instructions into the pipeline of microprocessor 400, the microprocessor 400 includes a branch prediction unit 407. The branch prediction unit 407 predicts the execution path of an instruction stream. In general, the branch prediction unit 407 predicts the existence of branch instructions within the instruction stream, and predicts the outcome of the branch. Consequently, as the macro instructions input to the pipeline proceed down the pipeline stages, the macro instructions are "speculatively" executed because of the uncertainty that the branch was properly predicted.

The macro instructions retrieved are input to an instruction decoder 409. In general, the instruction decoder 409 decodes the macro instructions operation code and source data. In a preferred embodiment, the instruction decoder 409 receives Intel® architecture compatible macro instructions, and determines the type of instruction received. The instruction decoder 409 breaks down the macro instruction into one or more micro-operations (micro-ops) with associated micro-operands. The one or more micro-ops, corresponding to the decoded macro instruction, specify the equivalent function.

The instruction decoder is coupled to an allocator 412, also located within the in-order fetch and issue cluster 403. The micro-ops generated in the instruction decoder 409 are input to the allocator 412. In general, the allocator 412 allocates resources necessary to execute each micro-op. In the preferred embodiment, the microprocessor 400 performs out-of-order execution, wherein micro-ops are executed out of the original program order. During retirement of the micro-ops, the original program order is restored. The allocation of resources to the out-of-order cluster is described below.

The out-of-order cluster 410 contains a reservation station (RS) 415, a reorder unit 420, a real register file (RRF) 428, and retirement logic 440. The reorder unit 420 comprises a reorder buffer 425 and reorder logic 435. The reorder unit 420 provides capabilities for speculative execution, register renaming and out-of-order execution for the microprocessor 400. In a preferred embodiment of the present invention, the reorder buffer 425 is implemented as a multi-port register file. The reorder buffer 425 is managed as a first in first out (FIFO) register file. Both source reads and reorder buffer write-backs operate on the reorder buffer 425 as a register file. The RRF 428 comprises the architectural registers of the microprocessor 400.

The reorder buffer 425 supports out-of-order execution by allowing the superscaler execution unit 430 to complete execution of instructions and write-back the results without regard to other instructions that use the same logical register. Therefore, as far as the superscaler execution unit 430 is concerned, micro-ops complete out-of-order. Subsequently, logic in the out-of-order cluster 410 reorders the completed micro operations into the original sequence issued by the in order fetch and issue block 403. To support register renaming and out-of-order execution, the in order fetch and issue cluster 403 maintains a mapping of logical registers, located in the real register file 428, to physical registers allocated in the reorder buffer 425. In addition, the reorder buffer 425 supports speculative execution by buffering the results of the superscaler execution cluster 430 before committing the results to architecturally visible state in the RRF 428.

The reorder buffer 425 is utilized to support register renaming. In general, register renaming allocates a new physical register from a logical register, as the destination for a predefined architectural register. In microprocessor 400, register renaming renames logical registers associated with the RRF 428 and allocates physical registers in the reorder buffer 425. Consequently, by renaming the registers, the superscaler execution cluster 430 executes different instructions in overlapping clock cycles even though the instructions utilize the same architectural register because different physical registers are allocated in the reorder buffer 425 for each micro-op.

The allocator 412 allocates an entry in the reorder buffer 425. The allocator 412 allocates and deallocates entries in the reorder buffer 425 in a FIFO manner. Upon allocation of a micro-op to a reorder buffer entry, the allocator 412 provides the reorder unit 420 with physical destination addresses to identify the allocation. Each physical destination in the reorder buffer 425 contains micro-op result data, flags, a code for the result data, fault data, and a valid bit, which indicates whether or not the corresponding data entry is valid. During the high phase of the system clock, the allocator 412 provides the three physical destination addresses to the reorder unit 420. In a subsequent low phase of the clock cycle, the in-order fetch and issue cluster 403 provides information to write entries into the reorder buffer 425. Also, on the low phase of the clock cycle, the entries are written into the reorder buffer 425. In a preferred embodiment, up to four micro-ops are allocated in the reorder buffer 425 in any given clock.

For each micro-op, the allocator 412 allocates an entry in the reservation station 415. Each entry in the reservation station 415 stores a valid bit, to indicate if the entry is valid, the micro-op instruction code, two source data entries and corresponding source data valid bits. In addition, the reservation station 415 stores two physical source fields identifying the location of the source data if the entry is not valid, and a physical destination for the result of the micro-op. Upon allocation of entries in the reservation station 415 and reorder buffer 425, each micro-op waits in the reservation station 415 for both available resource data and an execution unit in the superscalar execution cluster 430. When the resource data and the appropriate execution unit are ready, the reservation station 415 dispatches the micro-op to an execution unit in the superscalar execution cluster 430.

The out-of-order cluster 410 is coupled to the superscaler execution cluster 430. The superscaler execution cluster 430 executes instructions utilizing source data stored in the reservation station 415. For the present embodiment, the superscalar execution cluster 430 comprises four execution units (AGU 450, IEU 449, FEU 447 and MIU 445). In a preferred embodiment, the superscalar execution cluster 430 comprises an address generation unit (AGU 450), an integer execution unit (IEU 449), a floating point execution unit (FEU 447), and a memory interface unit (MIU 445). Upon execution of the micro-op in the superscalar execution unit 430, the corresponding execution unit writes the result data, the architectural flags, and any fault information in the appropriate physical destination entry in the reorder buffer 425.

The retirement logic 440, contained within the out-of-order cluster 410, retires the write-back results stored in the reorder buffer 425 for each executed micro-op. In general, the retirement logic 440 retires reorder buffer 425 entries by evaluating the physical destination entries in the reorder buffer 425 in the order allocated. The retirement logic 440 retires the physical destination entries by transferring write-back data into a corresponding logical register in the RRF 428 so as to commit the write-back data to the current architectural state of the microprocessor 400. Because the allocator 412 allocates the physical destination entries in the reorder buffer 425 in the original program order, and the retirement logic 440 retires the physical destination entries in the same order, the original program order is maintained.

As discussed above, the allocator 412 allocates resources to the reorder buffer 425 to allocate physical registers to support speculative execution and register renaming. The reorder buffer 425 is accessed by the reorder logic 435 during a register rename and reorder buffer read (ROB read) stages. A read from the reorder buffer 425 occurs during the ROB read stage and consists of reading operand sources for the particular micro-op being executed in the superscalar execution cluster 430. In order to perform a read from the reorder buffer 425, the sources for the micro-ops are read from the reorder buffer 425. Each micro-op issued by the in-order fetch and issue cluster 403 contains two source data locations. The source data locations may reside in the reorder buffer 425, real register file 428 or the in-order fetch and issue cluster 403 as currently decoded instructions. Because the superscalar execution cluster contains four execution units, a ROB read may require eight reads from the reorder buffer 425 (i.e. two source destinations for each micro-op executed).

The superscalar execution cluster 430, upon completion of executing micro-ops out-of-order, writes back result data to the reorder buffer 425. Specifically, when micro-ops are allocated to the reorder buffer 425, each micro-op is assigned with a reorder buffer entry. Consequently, the results, computed by the superscaler execution unit 430, are written into the assigned reorder buffer entry during write back.

The superscalar execution unit 430 contains an address generation unit 450. In order to access the memory 460, the address generation unit 450 calculates a physical address. In order to generate the linear address, the address generation unit 450 contains a segment block 510 (FIG. 5) that loads segment selector and descriptor data into a segment register. The address generation unit 450 is coupled to the reservation station 415 and memory subsystem 455. Upon generation of the linear address, the address generation unit 450 sends the linear address to the memory subsystem 455, which computes the physical address (performing paging if needed), accesses the memory, and writes the requested data back to the out-of-order cluster 410.

Figure 5:
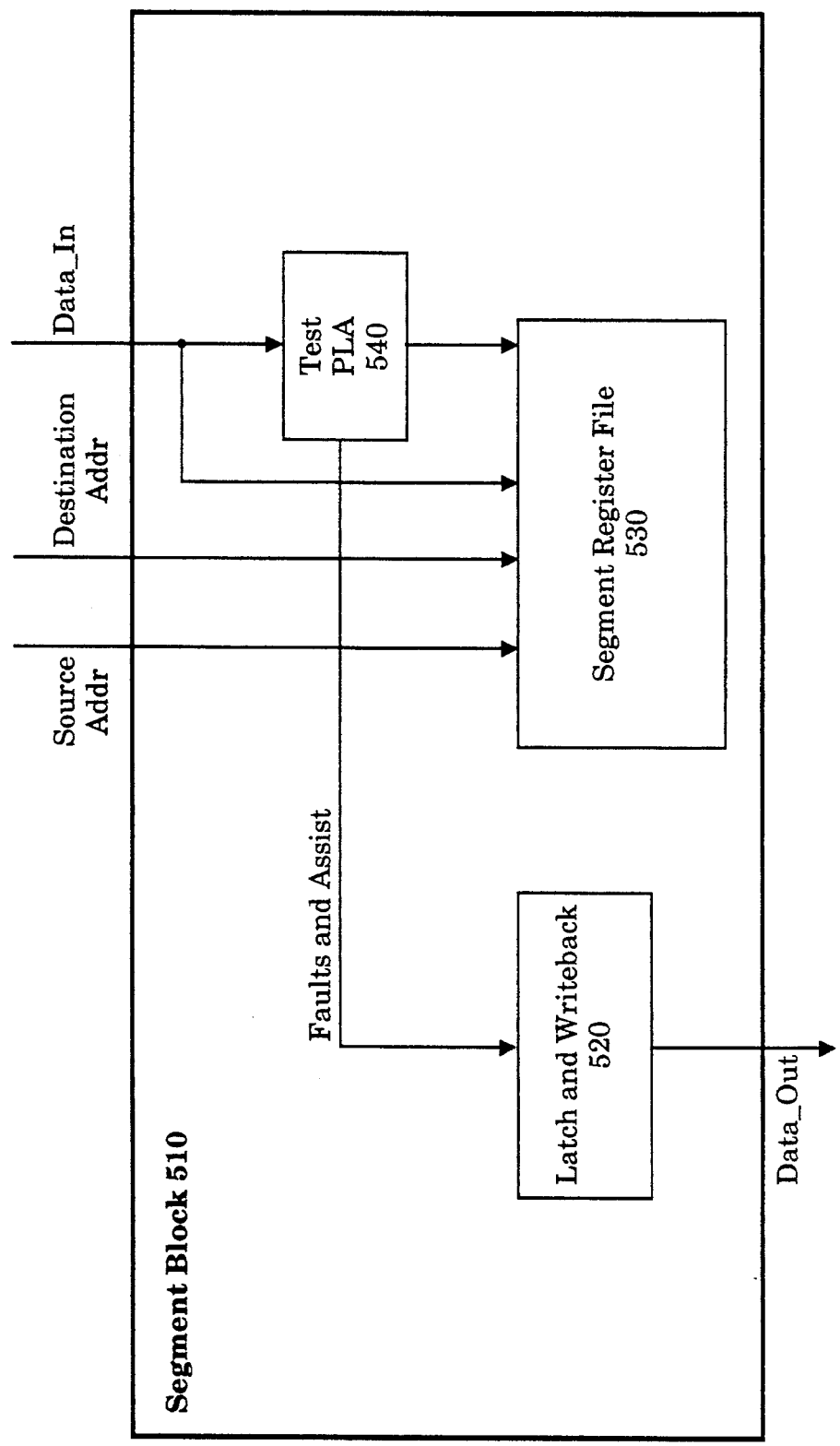
FIG. 5 illustrates a segment block utilized in loading a segment register in accordance with the present invention.

Referring to FIG. 5, a segment block for loading a segment register in accordance with the present invention is illustrated. A segment block 510 is a component within the address generation unit 450. The segment block 510 contains a test programmable logic array (PLA) 540, a segment register file 530, and write and latch back logic 520. In general, the segment block 510 receives Data_In and addresses from the out-of-order cluster 410 as inputs, executes fault and special handling checks, and loads a segment register in the segment register file 530. In a preferred embodiment, the operation is performed by microcode located within the microprocessor 400. In order to implement the microcode in a microprocessor, the microprocessor 400 contains a microcode sequencer, a read only memory (ROM) for storing micro instructions, and associated hardware. The latch and writeback logic permits the segment block 510 to transfer data, including faults and assist, to the out-of-order cluster 410. The operation of the microcode and the test PLA 540 is described more fully below.

The present invention includes a unique method and apparatus for loading a descriptor into a segment register. The same overall sequence flow is executed to load a descriptor into a segment register regardless of the operating mode of the Intel® architecture microprocessor. In a preferred embodiment of the present invention, the load operation is performed via microcode and programmable logic arrays (PLAs).

Figure 6:
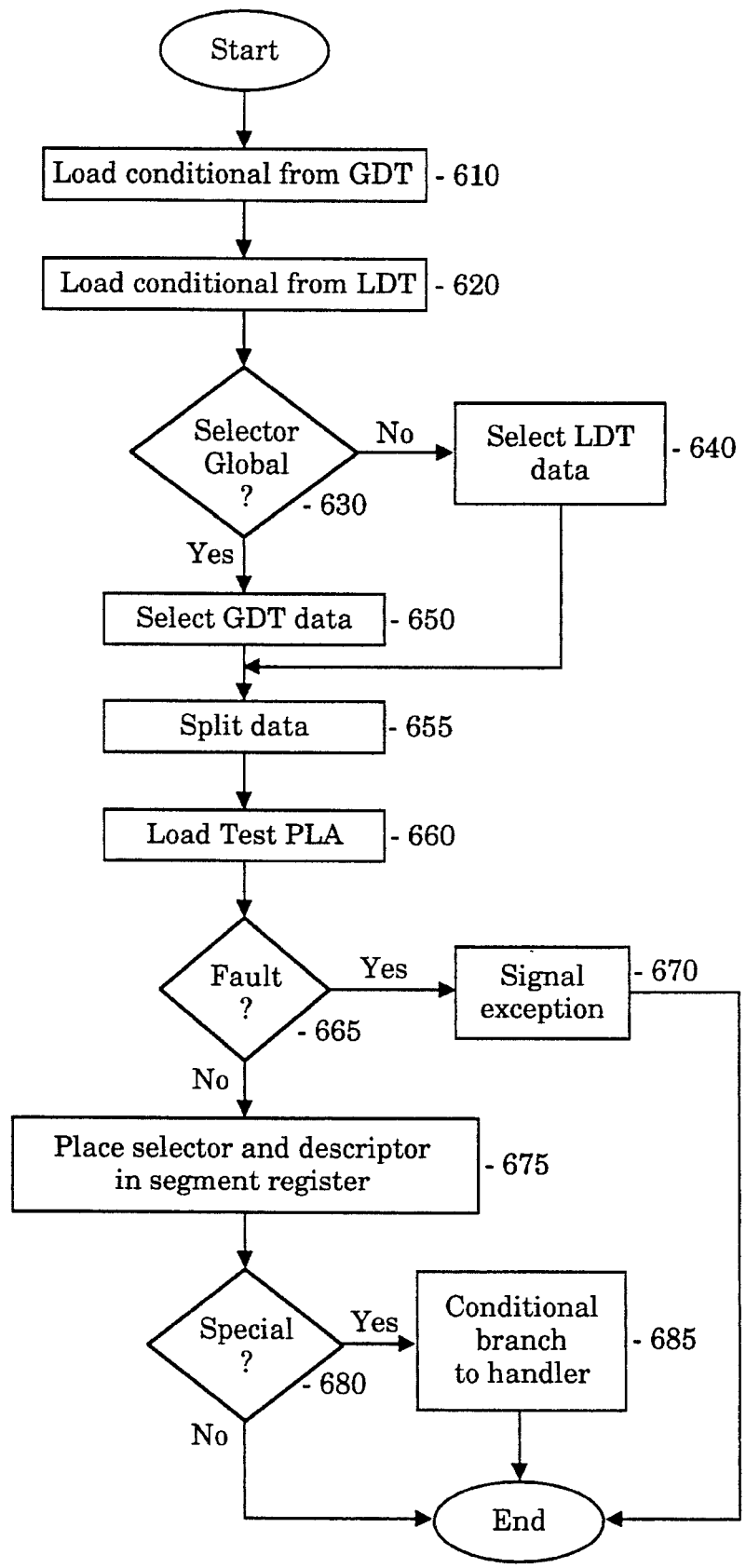
FIG. 6 illustrates a high level flow diagram illustrating the method for loading a descriptor into a segment register for real, protected, and virtual 8086 modes.

Referring to FIG. 6, a high level flow diagram illustrating the method for loading a descriptor into a segment register for real, protected, and virtual 8086 mode are illustrated. In protected mode, the full functionality of each step illustrated in FIG. 6 is utilized. In one embodiment, the method is implemented through a plurality of micro instructions stored in a ROM within the Intel® architecture microprocessor. As shown in steps 610 and 620 in FIG. 6, two descriptor loads from the global descriptor table (GDT) and the local descriptor table (LDT) are executed. However, only one descriptor from either the GDT or LDT is utilized. The load operations from the LDT and the GDT require access to memory. Consequently, a load micro operation is dispatched to the memory subsystem 455. If the load operations are not canceled prior to completion, the descriptor data are stored in the reservation station 415. Alternatively, if the load operation is canceled, no load is sent to the memory 460. Instead, the AGU 450 writes back an undefined value and sets a flag, indicating the cancellation of the operation, to complete the operation.

Figure 7A:
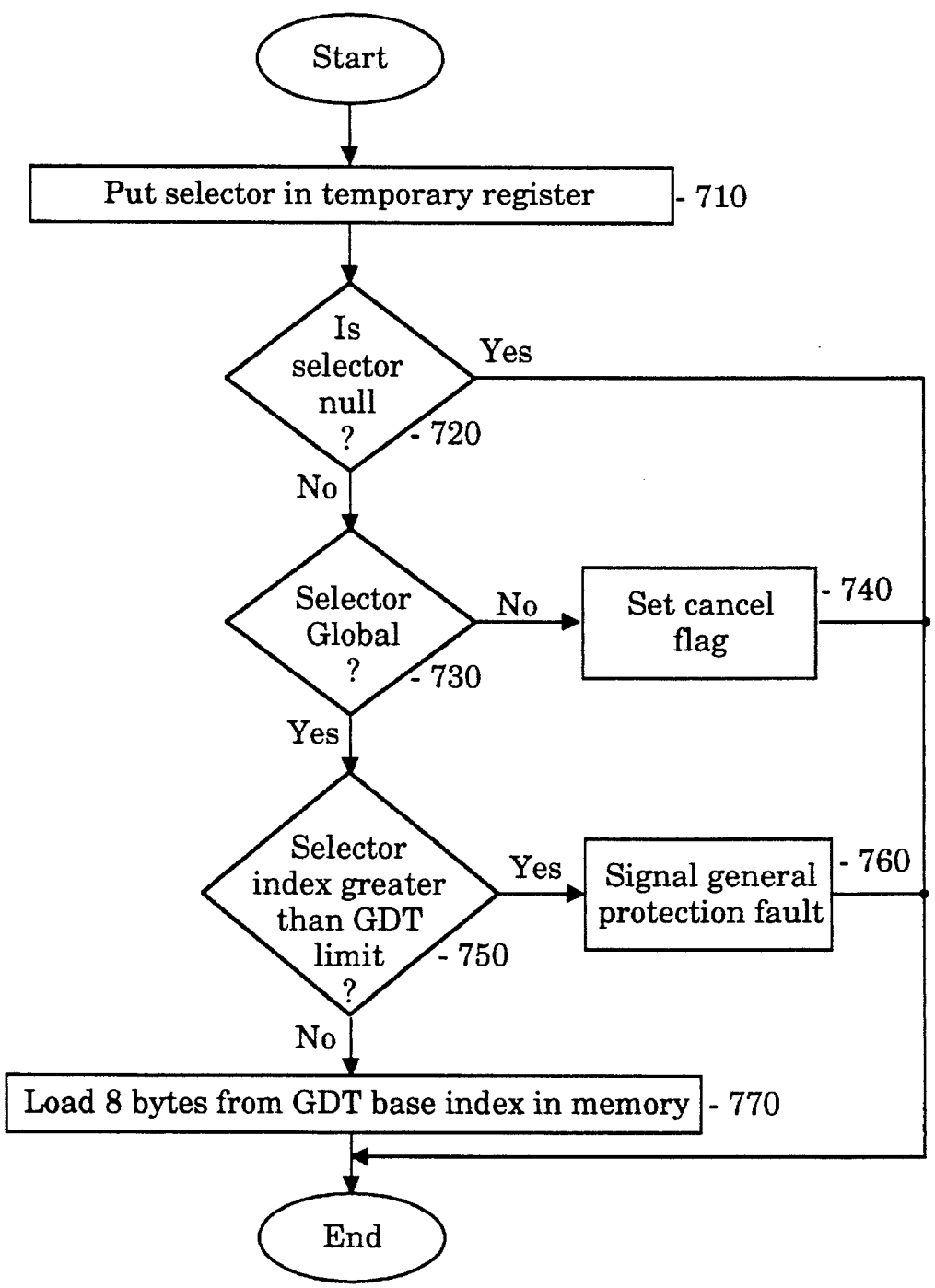
FIG. 7a illustrates a method for executing a load operation from a global descriptor table when operating the Intel® architecture microprocessor in protected mode.
Figure 7B:
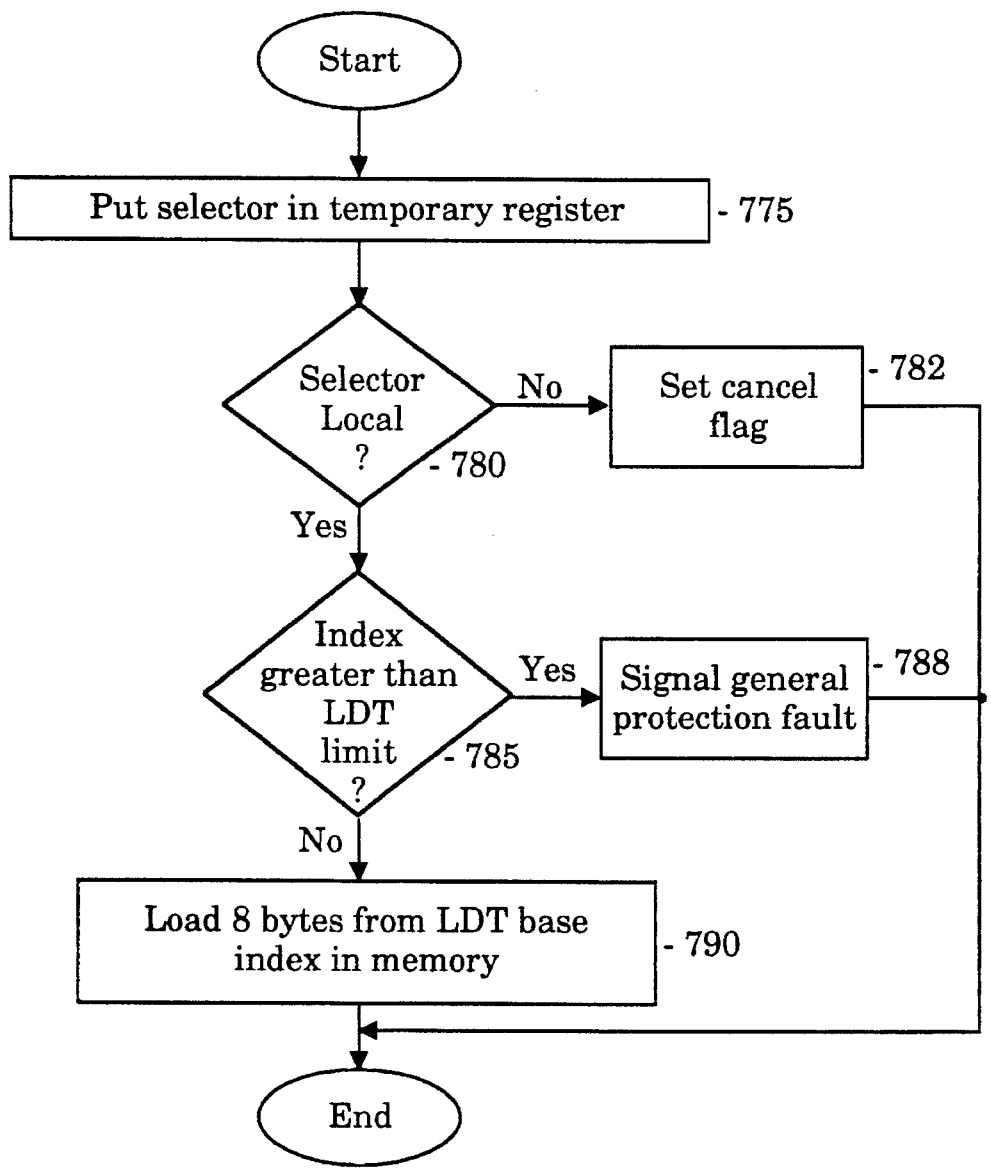
FIG. 7b illustrates a method for executing a load operation from a local descriptor table when operating the Intel® architecture microprocessor in protected mode.

The segment block 510 determines whether the selector is a global selector or local selector by examining the table indicator (TI) bit in the segment selector as shown in step 730 in FIG. 7a, and in step 780 in FIG. 7b. The segment block 510 uses the selector input as an index into the local descriptor table or the global descriptor table. Specifically, the segment block 510 utilizes an adder to generate the index by adding the selector index to the base address provided in the LDTR for the LDT load and the GDTR for the GDT load. Consequently, a 64 bit global descriptor from the GDT is loaded into a temporary reorder buffer register 425 if the selector is global. No load is performed otherwise. A 64 bit local descriptor from the LDT is also loaded into a separate temporary reorder buffer register 425 if the selector is local. No load is performed otherwise. In both cases, the selector is also stored in a temporary segment register. In general, if the table indicator bit in the segment selector indicates use of the GDT, then the descriptor data from the GDT is selected as indicated by block 650. In addition, the load from the local descriptor table is canceled. Alternatively, if the table indicator bit in the segment selector indicates the use of the LDT, then the descriptor data from the LDT is selected as indicated by block 640. In addition, the load operation from the GDT is canceled. In a preferred embodiment, each load operation has a corresponding cancel flag. If a load is canceled, then the corresponding cancel flag is set to indicate the cancellation of the load. In order to select the appropriate load, a select microinstruction is executed. The select microinstruction reads the cancel flags, and selects the non-canceled descriptor data based on the state of the cancel flags.

The microinstruction flow of the present invention splits the 64 bit descriptor data selected into two 32 bit quantities as shown in block 655. The splitting of the 64 bit descriptor data into two 32 bit quantities is performed based upon the hardware configuration of the preferred embodiment, and is not required in a hardware embodiment employing a 64 bit data bus into the AGU 450. The two 32 bit data quantities and the selector, stored in the temporary segment register, are input to a test programmable logic array (PLA). In general, the test PLA comprises a fault PLA and a branch PLA. The fault PLA receives the selector and descriptor data and checks for permission violations, or faults, as shown in the decision block 665. If a fault violation occurs, the segment block 510 signals a fault exception as indicated by block 670. In addition, the load descriptor operation is terminated Alternatively, if no fault is detected, then the segment block 510 loads the two 32 bit descriptor data quantities, along with the selector, into the appropriate segment register as illustrated in block 675. The two 32 bit descriptor data quantities are also input to the branch PLA. In general, the branch PLA detects the need for special handling of the register segment load operation as indicated by the decision block 680. If special handling is required, the branch PLA returns a micro instruction pointer identifying the appropriate handler in microcode, and sets a valid flag in a result register to indicate generation of the microcode handler address. The calling of the handler routine is illustrated in block 685. A conditional indirect branch is subsequently utilized to reach the handler.

FIG. 6 illustrates the general method for loading a segment register in accordance with the present invention; however, the specific method is dependent upon the operating mode of the Intel® architecture microprocessor. As described above, in block 610 of FIG. 6, a load from GDT is issued within the AGU 450. When the microprocessor is operating in real mode or virtual 8086 mode, the cancel flag, corresponding to the GDT load, is unconditionally set to indicate cancellation of the load operation. Consequently, no GDT load operation is performed. Instead, the AGU 450 write backs undefined data. As discussed above, the descriptor data is not utilized for loading a segment register when the microprocessor is operating in real and virtual 8086 modes. Consequently, the undefined data, written from the AGU 450, is not utilized. In block 620 of FIG. 6, a load from LDT is issued within the AGU 450. When the microprocessor is operating in real mode or virtual 8086 mode, the cancel flag, corresponding to the LDT load, is unconditionally set to indicate cancellation of the load operation. Consequently, no LDT load operation is performed.

Similar to the GDT load operation, in response to the LDT load operation, the AGU 450 write backs unused undefined data. The select operation 650 then arbitrarily selects one of the two unused values. The value selected in these cases is unimportant, because neither value is placed in the segment register. The selected value is split into two 32-bit quantities. In the load test PLA step 660, the two 32-bit descriptor quantities are ignored. Instead, the selector is shifted left by 4 to generate a base address. The base address, combined with a limit value indicating a 64 kilobyte segment and a rights value indicating a 16-bit writeable data segment present in linear address space, is used to form a segment descriptor. This descriptor is not checked for validity or special handling, because the test PLA is disabled in real and virtual 8086 modes. As a result, the "no" decision in step 655 is taken, and the selector and descriptor built in step 660 are placed in the segment register in step 675. Also, because special handling is not checked, the "no" decision in step 680 is taken, and no microinstruction pointer is generated.

Referring to FIG. 7a, a method for executing a load operation from the global descriptor table when operating the Intel® architecture microprocessor in protected mode is illustrated. The method illustrated in FIG. 7a provides a more detailed sequence for block 610 illustrated in FIG. 6. The segment selector input to the segment block 510 is stored in a temporary segment register as shown in block 710. The index of the segment selector is examined to determine whether the selector is a null selector as shown in the decision block 720. If the selector is less than three, then the selector is a null selector, and the segment block 510 cancels the operation, writes back undefined data, and sets the corresponding cancel flag.

The segment block 510 examines the TI bit of the segment selector, and if the TI bit is set, indicating a local selector, the segment block 510 sets the cancel flag as shown in step 740. The AGU also cancels the load operation in the memory subsystem 455. In addition, the segment block 510 examines the segment selector for limit violations. Specifically, the segment block 510 compares the index of the segment selector with the global descriptor table limit as shown in decision block 750. If the descriptor indicated by selector index lies outside the GDT limit, then the segment block 510 signals a general protection fault as shown in block 760. Alternatively, if the descriptor indicated by the segment selector index lies within the GDT limit, the segment block 510 initiates a 64 bit load to obtain the descriptor from the global descriptor table as shown in step 770.

Referring to FIG. 7b, a method for executing a load operation from the local descriptor table when operating the Intel® architecture microprocessor in protected mode is illustrated. The method illustrated in FIG. 7b provides a more detailed sequence for block 620 illustrated in FIG. 6. In block 775, upon receipt of the segment selector, the segment selector is stored in a temporary segment register. The segment block 510 examines the TI bit of the segment selector, and if the TI bit is not set, then the segment block 510 sets the cancel flag and cancels the load as shown in block 782. Alternatively, if the TI bit is set to indicate a local descriptor, then a limit violation check is performed. As shown in decision block 785, if the descriptor indicated by the selector index lies inside the LDT limit, then a general protection fault is signaled as shown in step 788. Alternatively, if the descriptor indicated by the selector index lies inside the LDT limit, then a 64 bit load from the LDT is initiated as shown in block 790.

In protected mode, a segment descriptor load from memory is required. The segment block 510 utilizes the selector input as an index into the LDT or the GDT. The address generation unit 450 contains an adder to mask and add the selector index to the base address in the LDTR or GDTR. As discussed above, the method for loading a segment register includes two loads from memory, wherein one load is executed and the other is canceled. The destination for the GDT load is the GDTR, and the destination for the LDT load is the LDTR. In order to place the selector and descriptor in the appropriate segment register, the segment block 510 writes the input selector to a temporary segment register in the segment register file 530. In addition, a null selector bit is written in the temporary segment register. The null bit indicates the detection of a null selector. The selector and null selector bit are written even if the load segment is canceled. The selector and null bit are transferred to the destination segment register if no violation is detected by the fault PLA when the descriptor is written. However, if a fault is detected in the fault PLA, the destination segment register is not written. The fault PLA also receives the null bit. The fault PLA utilizes the null bit to signal a fault when a null selector is not permissible. In real and virtual 8086 modes, no segment descriptor load is required. Nonetheless, the selector is still written into the temporary segment register. The null selector bit, however, is not set, regardless of the input selector value.

If a limit violation occurs on LDTR, GDTR, or IDTR, the segment block 510 indicates that the input the selector is to be used as the error code using a subfield of the fault information field. After loading the data from the appropriate descriptor table in memory, the data are transferred to the reservation station 415. The segment block 510 issues a conditional move operation to transfer the descriptor data from the GDT or LDT load to the destination segment register in the segment register file 530. The data selected depends on the values of the cancellation flag for the loads. In one embodiment, an extract operation is executed. The extract operation moves the upper 32 bits of the 64 bit descriptor data field into another register so as to accommodate the 32 bit wide input of the AGU 450. However, the extract operation is not required for hardware embodiments of the AGU capable of receiving 64 bit inputs. Finally, a "segment build" operation is dispatched to the segment block 510, and the descriptor data are transmitted to the segment register file 530. The segment build operation is described more fully below.

In one embodiment of the present invention, data are transferred to segment registers by executing either a "segment move" operation or a "segment build" operation. The segment move operation contains parameters for specifying a source segment register and a destination segment register. In general, the segment move operation transfers data from the source segment register to the destination segment register. The segment build operation includes information for specifying a source segment register, that contains an input segment selector, a destination segment register, two 32-bit descriptor data quantities, and a test PLA check identifier. The segment source register is the destination register from the previous segment descriptor load operations. The segment build operation transfers the selector from the source segment register and the descriptor data from in the reservation station 415, performs fault and branch checks, and writes the data into the segment register destination in the segment register file 530. Note, the segment build operation does not retrieve data from memory but transfers data from the reservation station 415 to the designated segment register in the segment register file 530. If a fault violation occurs, the segment register is not updated, and a fault status is generated to indicate the type of violation detected.

In protected mode, in order to execute a segment build operation, the segment descriptor data are passed through the test PLA. In addition, the selector and null selector bit are read from the segment source register. If the fault PLA indicates a fault or assist, then the AGU 450 generates a fault or assist. If no fault is detected, the selector and descriptor data are transferred to the destination segment register. If the AGU 450 detects a fault, assist or branch via the test PLA, the AGU 450 sets a state bit so that segment move and segment build operations, executed subsequent to the fault operation, do not change the architectural state of the segment register file 530. Instead, any segment move or segment build operations issued subsequent to the fault are executed; however, the internal state in the AGU 450 is not affected. In addition, if the test PLA detects that the segment requires special handling, the segment selector and descriptor data are written into the designation segment register, and a flag is set so that microcode can conditionally branch to the microcode address produced by the test PLA.

Multiple segment move and segment build operations are ordered by microcode to insure proper ordering. The proper ordering mechanism allows microcode to issue the segment move and segment build operations without the need to wait for one operation to retire before beginning execution of another. Whenever a segment build operation retires and a fault condition is signaled, or when a mispredicted microcode branch retires, the AGU 450 resets the state bit to indicate the fault condition.

The segment move operation does not invoke checks in the test PLA. Instead, the segment move operation moves the segment register from one entry in the segment register file 530 to a second entry in the segment register file 530. The segment move operation copies the entire segment register regardless of the operating mode of the microprocessor.

In real mode, segment build operations execute the following steps. The destination segment register selector is set to the source segment register selector. The source segment register selector is shifted by four so as to generate the destination segment register base. All other fields in the destination segment register, such as the limit and access rights byte, are not written. In virtual 8086 mode, the destination segment register selector is set to the source segment register selector, and the source segment register selector is shifted by four so as to generate the destination segment register base. The access rights byte, is set to indicate a writeable data segment with privilege 3. In virtual 8086 mode, the segments are limited to 64 kilobytes. Because the protection model does not exist in real or virtual 8086 mode, no checks in the test PLA are performed. Instead, the test PLA is disabled to ensure that no fault or branch addresses are generated.

Figure 8:
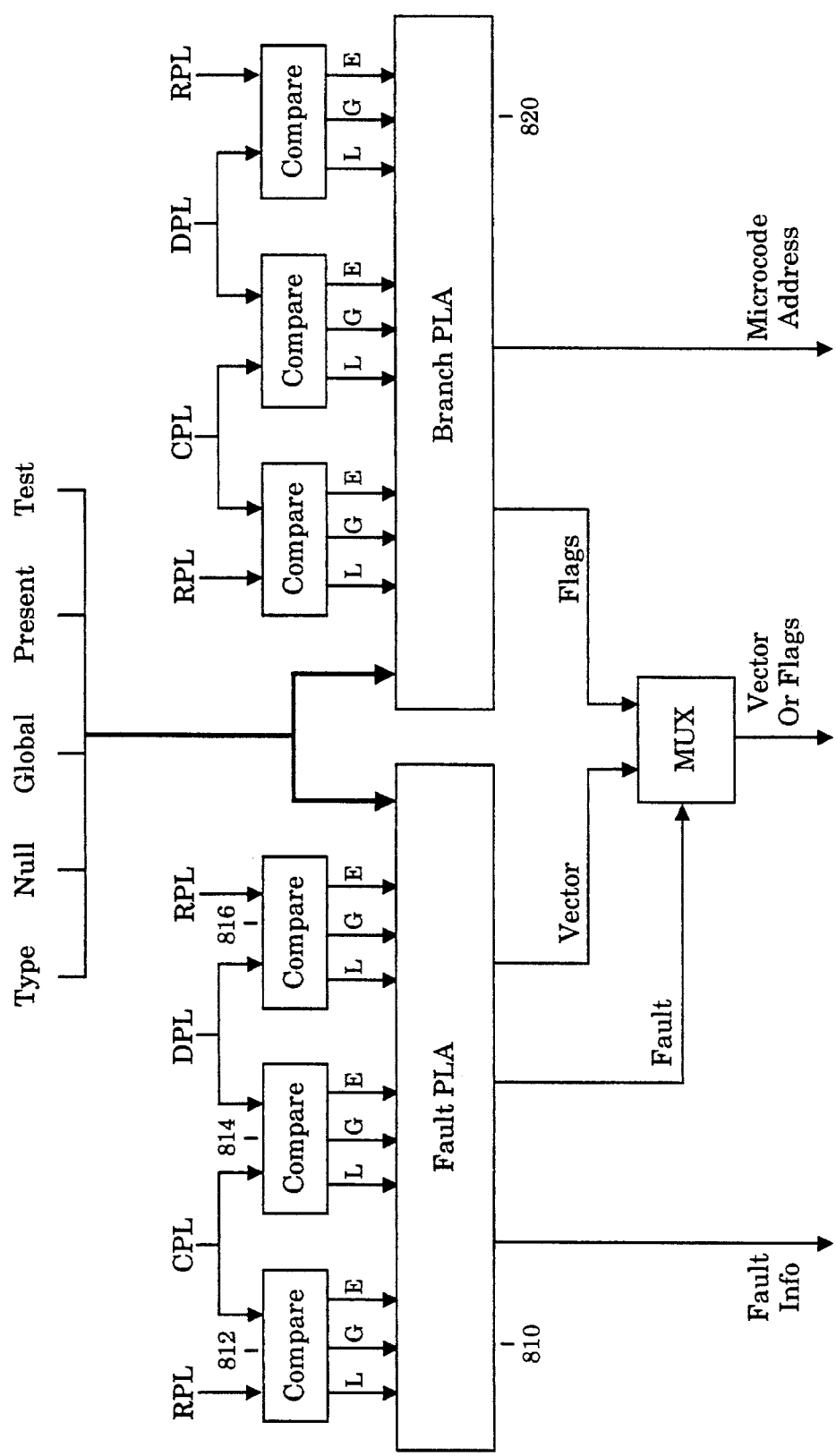
FIG. 8 illustrates a test programmable logic array (PLA) configured in accordance with the present invention.

As discussed above, in a preferred embodiment, the test PLA contains the fault PLA and the branch PLA as illustrated in FIG. 8. The fault PLA 810 evaluates any fault condition before a segment register is moved to an architecturally visible state. The branch PLA 820 checks for conditions requiring special microcode handling (e.g. loading a descriptor which is a call gate). The branch PLA 820 sets a flag indicating that a branch target was generated, and generates a microcode address that identifies the microcode handler routine. The fault PLA 810 requires information concerning the relative value of each of the privilege levels (i.e. descriptor privilege level (DPL), requestor privilege level (RPL), and current privilege level (CPL). The DPL is obtained from the descriptor, the RPL is obtained from the selector, and the CPL reflects the privilege level of the currently executing task. The fault PLA 810 contains three corresponding comparators 812, 814 and 816 that generate inputs to the fault PLA 810. The comparators 812, 814 and 816 generate nine signals indicating a relative comparison of the RPL, CPL and DPL. The fault PLA 810 utilizes the inputs to determine information concerning the privilege levels.

In addition to the comparison values, a null bit read from the segment register file is an input to the fault PLA. The null bit indicates whether the selector is a null selector. The segment type is an additional 5 bit input to the fault PLA 810. The segment type indicates whether the segment is of the memory or system segment type. For code and data segments, the segment type indicates the type of read/write rights corresponding to the segment. For system segments, the type field indicates the type of system segment. A present bit is input to the fault PLA 810. The present bit is located in the descriptor and indicates whether the segment is present in memory. A global bit, bit 2 of the source segment register selector, is also input to the fault PLA 810 to indicate whether the segment is local or global. The test name is input to the fault PLA 810. The test name determines which fault checks are performed on the input data to determine failure.

The outputs of the fault PLA 810 are the fault information field and a fault vector. The fault information field indicates that a fault occurred and the type of error code for the fault. The fault vector indicates the type of fault that occurred. The fault PLA 810 generates a general protection fault, a segment not present fault, a stack fault, an invalid TSS fault, and a segment accessed bit assist. Each of these conditions has an encoding to indicate the type of fault or assist. Retirement logic, located in the reservation station 415, reads the field when the operation retires and sends the flow of execution to the appropriate handler if a fault or assist occurred.

The branch PLA 820 receives the same inputs as the fault PLA 810. In general, the branch PLA 820 detects a segment type that requires a flow of control change (i.e. a special microcode handler routine). The branch PLA 820 contains a 13 bit output vector to indicate a location in the microcode ROM. When a conditional branch is detected, the branch PLA 820 generates the vector for the micro instruction pointer to indicate the new point of execution in the microcode. If a branch is required, the branch PLA 820 sets a flag to indicate generation of the output vector. Alternatively, if a branch is not required, the flag is cleared. If the fault PLA generates a fault, no branch target is generated.

In the foregoing specification, the invention has been described with reference to specific exemplary embodiments thereof. However, it will be evident that various modifications and changes may be made thereto without departing from the broader spirit and scope of the invention as set forth in the following claims. Accordingly, the specification and drawings are to be regarded in an illustrative sense rather than a restrictive sense.

What is claimed is:

1. A method for loading a segment register in a microprocessor operable in multiple modes, said method comprising the steps of:

receiving a segment selector for a corresponding segment register load, said segment selector specifying a descriptor stored in a corresponding descriptor table;

issuing a plurality of conditional load operations to a memory subsystem, wherein each of said plurality of conditional load operations specifies loading of a descriptor from a corresponding descriptor table;

checking, in said memory subsystem, said segment selector associated with each of said plurality of conditional load operations to determine whether said segment selector specifies a descriptor table corresponding to said descriptor;

executing, in said memory subsystem, one of said plurality of conditional load operations if said segment selector specifies a descriptor table corresponding to said descriptor;

writing said descriptor corresponding to said segment selector to a temporary segment register if said segment selector specifies said descriptor table corresponding to said descriptor;

writing invalid data to said temporary segment register and identifying said invalid data as invalid if said segment selector does not specify a descriptor table corresponding to said descriptor: and loading said segment register, by utilizing said descriptor and selector, in accordance with an operating mode of said microprocessor.

2. The method for loading a segment register as set forth in claim 1, wherein said microprocessor comprises a microprocessor operable in protected mode, real mode, and virtual-8086 mode.

3. The method for loading a segment register as set forth in claim 2, wherein the step of loading said segment register comprises the steps of:
   selecting a descriptor based on said segment selector;
   determining whether said segment selector and said descriptor loaded represent a valid segment; and
   determining whether special descriptor handling, for said descriptor loaded, is required.

4. The method for loading a segment register as set forth in claim 2, wherein the step of issuing a plurality of conditional load operations comprises the steps of:
   issuing a conditional load operation to load a local descriptor from a local descriptor table; and
   issuing a conditional load operation to load a global descriptor from a global descriptor table.

5. The method for loading a segment register as set forth in claim 2, wherein the step of loading said segment register comprises the steps of:
   loading a segment register base and selector fields when said microprocessor is operating in said real mode; and
   loading a segment register base, selector field, rights field and limit field when said microprocessor is operating in said protected mode and said virtual-8086 mode.

6. The method for loading a segment register as set forth in claim 2, wherein the step of canceling a conditional load operation comprises the steps of:
   examining a table indicator (TI) bit in said segment selector;
   examining a null value associated with said segment selector;
   canceling said conditional load from said local descriptor table when said TI bit indicates selection of a global descriptor;
   canceling said conditional load from said global descriptor table when said TI bit indicates selection of a local descriptor;
   canceling said conditional load from said local descriptor table and from said global descriptor table when said null bit indicates a null selector; and
   canceling said conditional load from said local descriptor table and from said global descriptor table when a limit violation occurs or when in real or virtual 8086 modes.

7. The method for loading a segment register as set forth in claim 6, wherein the step of canceling a conditional load operation further comprises the steps of:
   setting a first cancel flag and returning undefined data for the load to cancel said conditional load operation issued to said local descriptor table when said TI bit indicates selection of a global descriptor;
   setting a second cancel flag and returning undefined data for the load to cancel said conditional load issued to said global descriptor table when said TI bit indicates selection of a local descriptor; and
   setting said first and second cancel flags and returning undefined data for the loads to cancel said conditional load issued to said local descriptor table and said global descriptor table, respectively, when said null bit indicates a null selector when said limit violation occurs, or when in real or virtual 8086 modes.

8. The method for loading a segment register as set forth in claim 3, wherein the step of selecting a descriptor based on said segment selector comprises the steps of:
   examining a first and second cancel flags when said microprocessor is operating in protected mode;
   selecting a descriptor loaded based on said first and second cancel flags when said microprocessor is operating in protected mode; and
   selecting any descriptor when said microprocessor is operating in said real mode and when said microprocessor is operating in said virtual-8086 mode.

9. The method for loading a segment register as set forth in claim 2, wherein the step of determining whether said segment selector and said descriptor loaded represent a valid segment comprises the steps of:
   checking whether said segment selector and descriptor loaded are valid using a fault programmable logic array (PLA);
   disabling said fault PLA when said microprocessor is operating in real or virtual-8086 mode;
   inputting said segment selector, including privilege levels, and descriptor loaded into said PLA; and
   generating information indicating a violation type and error code when an invalid segment selector and descriptor are detected.

10. The method for loading a segment register as set forth in claim 3, wherein the step of determining whether special descriptor handling is required comprises the steps of:
    detecting special descriptor handling requirements for loading said segment register using a branch programmable logic array (PLA);
    disabling said branch PLA when said microprocessor is operating in real or virtual-8086 mode;
    setting a flag for conditionally branching to a microcode handler routine if said descriptor requires special handling; and
    generating a microcode address that identifies said microcode handler routine if said descriptor requires special handling.

11. The method for loading a segment register as set forth in claim 3, further comprising the step of setting a state bit to prevent subsequent operations from modifying said segment register when an invalid segment is detected or special descriptor handling is required until the invalid segment condition is accepted or until the special descriptor handler is invoked.

12. The method for loading a segment register as set forth in claim 4, wherein the step of issuing a conditional load operation to load a global descriptor from a global descriptor table when said microprocessor is operating in said protected mode comprises the steps of:
    storing said selector in a temporary register;
    determining whether said selector is a null selector;
    determining whether a selector index, located within said selector, specifies a descriptor located beyond a global descriptor table limit;
    signaling a general protection fault when said selector index specifies a descriptor located beyond said global descriptor table limit; and
    loading said global descriptor from said global descriptor table when said selector index indicates a descriptor located within said global descriptor table limit and said selector is not a null selector.

13. The method for loading a segment register as set forth in claim 4, wherein the step of issuing a conditional load operation to load a local descriptor from a local descriptor table when said microprocessor is operating in said protected mode comprises the steps of:

storing said selector in a temporary register;

determining whether a selector index, located within said segment selector, specifies a descriptor located beyond a local descriptor table limit;

signaling a general protection fault when said selector index specifies a descriptor located beyond said local descriptor table limit; and loading said local descriptor from said local descriptor table when said selector index indicates a descriptor located within said local descriptor table limit.

14. An apparatus for loading a segment register in a microprocessor, wherein said microprocessor is operable in multiple modes, said apparatus comprising:

memory, coupled to said microprocessor, for storing a plurality of descriptors arranged in a plurality of descriptor tables;

a memory subsystem, coupled to said memory, for interfacing said microprocessor to memory;

a segment block, including a microcode execution unit, and a plurality of temporary registers, coupled to said memory subsystem, said segment block being constructed to receive a segment selector for a corresponding segment register load, said segment selector specifying a descriptor stored in a corresponding descriptor table, said microcode execution unit being constructed to issue a plurality of conditional load operations to said memory subsystem, wherein each of said plurality of conditional load operations specifies loading of a descriptor from a corresponding descriptor table, said memory subsystem for executing one of said plurality of conditional load operations when said segment selector specifies a descriptor table corresponding to said descriptor, said memory subsystem for checking said segment selector and for writing said descriptor to said temporary register if said segment selector specifies a descriptor table corresponding to said descriptor, said memory subsystem for writing invalid data to said temporary register and for identifying said invalid data as invalid if said segment selector does not specify a descriptor corresponding to said descriptor table, and said microcode execution unit comprising a load operation to load said segment register, by utilizing said descriptor and selector, in accordance with an operating mode of said microprocessor.

15. The apparatus for loading a segment register as set forth in claim 14, wherein said microprocessor is operable in protected mode, real mode, and virtual 8086 mode.

16. The apparatus for loading a segment register as set forth in claim 15, wherein said microcode execution unit comprises a selection operation for selecting a descriptor based on said segment selector, said apparatus further comprising:

fault logic coupled to said microcode execution unit and said segment block for determining whether a protection fault occurs for said segment load operation; and branch logic coupled to said microcode execution unit and said segment block for determining whether special handling is required.

17. The apparatus for loading a segment register as set forth in claim 15, wherein said plurality of conditional load operations in said microcode execution unit comprise a conditional load operation to load a local descriptor from a local descriptor table, and a conditional load operation to load a global descriptor from a global descriptor table.

18. The apparatus for loading a segment register as set forth in claim 15, wherein said load operation is constructed to load a segment register base and selector fields when said microprocessor is operating in said real mode, and to load a segment register base, selector field, rights field and limit field when said microprocessor is operating in said protected mode and said virtual-8086 mode.

19. The apparatus for loading a segment register as set forth in claim 15, wherein said cancel operation in said microcode execution unit comprises an operation for examining a table indicator (TI) bit in said segment selector and a null value associated with said segment selector, said operation being utilized to cancel said conditional load from said local descriptor table when said TI bit indicates selection of a global descriptor, to cancel said conditional load from said global descriptor table when said TI bit indicates selection of a local descriptor, to cancel said conditional load from said local descriptor table and from said global descriptor table when said null bit indicates a null selector, and to cancel said conditional load from said local descriptor table and from said global descriptor table when a limit violation occurs or when processor is in real or virtual 8086 mode.

20. The apparatus for loading a segment register as set forth in claim 19, wherein said cancel operation in said microcode execution unit further comprises a plurality of cancel flags and an operation for setting a first cancel flag and returning undefined data for the load to cancel said conditional load operation issued to said local descriptor table when said TI bit indicates selection of a global descriptor, for setting a second cancel flag and returning undefined data for the load to cancel said conditional load issued to said global descriptor table when said TI bit indicates selection of a local descriptor, and for setting said first and second cancel flags and returning undefined data for the loads to cancel said conditional load issued to said local descriptor table and said global descriptor table, respectively, when said null bit indicates a null selector, when said limit violation occurs, or when in real or virtual 8086 mode.

21. The apparatus for loading a segment register as set forth in claim 16, wherein said microcode execution unit comprises a selection operation for selecting a descriptor loaded in a temporary register, said selection operation being constructed to examine said first and second cancel flags when said microprocessor is operating in protected mode, to select a descriptor loaded based on said first and second cancel flags when said microprocessor is operating in protected mode, and to select any descriptor when said microprocessor is operating in said real and virtual-8086 mode.

22. The apparatus for loading a segment register as set forth in claim 16, wherein said fault logic comprises a fault programmable logic array (PLA) for checking whether said segment selector and descriptor loaded are valid, said microcode execution unit being constructed to disable said fault PLA when said microprocessor is operating in real or virtual-8086 mode and to input said segment selector, including privilege levels, and descriptor loaded into said PLA, said fault PLA being constructed to generate signals indicating a violation type and error code when an invalid segment selector and descriptor are detected.

23. The apparatus for loading a segment register as set forth in claim 16, wherein said branch logic comprises a branch programmable logic array (PLA) for detecting special descriptor handling requirements for loading said segment register, said microcode execution unit being constructed to disable said branch PLA when said microprocessor is operating in real or virtual-8086 mode, and said branch PLA being constructed to set a flag for conditionally branching to a microcode handler routine if said descriptor requires special handling, and to generate a microcode address that identifies said microcode handler routine if said descriptor requires special handling.

24. The apparatus for loading a segment register as set forth in claim 16, wherein said microcode execution unit further comprises an operation to set a state bit to prevent subsequent operations from modifying said segment register when an invalid segment is detected or special descriptor handling is required until said micro-code execution unti recognizes said invalid segment condition or branches to said special descriptor handler.

25. The apparatus for loading a segment register as set forth in claim 17, wherein said conditional load operation which loads global descriptors from a global descriptor table is further constructed to transfer said selector to one of said temporary registers, to determine whether said selector is a null selector, to determine whether a selector index, located within said selector, specifies a descriptor located beyond a global descriptor table limit, to signal a general protection fault when said selector index specifies a descriptor located beyond said global descriptor table limit, and to load said global descriptor from said global descriptor table when said selector index indicates a descriptor located within said global descriptor table limit and said selector is not a null selector when said microprocessor is operating in said protected mode.

26. The apparatus for loading a segment register as set forth in claim 17, wherein said conditional load operation which loads a local descriptor from a local descriptor table is further constructed to store a selector in a temporary register, to determine whether a selector index, located within said segment selector, specifies a descriptor located beyond a local descriptor table limit, to signal a general protection fault when said selector index specifies a descriptor located beyond said local descriptor table limit, and to load said local descriptor from said local descriptor table when said selector index indicates a descriptor located within said local descriptor table limit when said microprocessor is operating in said protected mode.

27. A microprocessor comprising:

an instruction fetch circuit for fetching instructions;

an instruction decoder, coupled to said instruction fetch circuit, for decoding and issuing said instructions fetched;

memory, coupled to said microprocessor, for storing a plurality of descriptors arranged in a plurality of descriptor tables;

a memory subsystem coupled to said memory for interfacing said microprocessor to said memory;

an address generation unit, coupled to an out-of-order cluster and said memory subsystem, for generating addresses for said memory, said address generation unit comprising a segment block, including a microcode execution unit, and a plurality of temporary registers, coupled to said memory subsystem, said segment block being constructed to receive a segment selector for a corresponding segment register load from said out-of-order cluster, said segment selector specifying a descriptor stored in a corresponding descriptor table, said microcode execution unit being constructed to issue a plurality of conditional load operations to said memory subsystem, wherein each of said plurality of conditional load operations specifies loading of a descriptor from a corresponding descriptor table, said memory subsystem for executing one of said plurality of conditional load operations when said segment selector specifies a descriptor table corresponding to said descriptor, said memory subsystem for checking said segment selector and for writing said descriptor to said temporary register if said segment selector specifies a descriptor table corresponding to said descriptor, said memory subsystem for writing invalid data to said temporary register and for identifying said invalid data as invalid if said segment selector does not specify a descriptor corresponding to said descriptor table, said temporary register being constructed to receive a descriptor from each conditional load operation not canceled, and said microcode execution unit comprising a load operation to load said segment register, by utilizing said descriptor and selector, in accordance with an operating mode of said microprocessor; and retirement logic for reordering said instructions in said original program order.

28. The microprocessor as set forth in claim 27, wherein said microprocessor is operable in protected mode, real mode, and virtual 8086 mode.

29. The microprocessor as set forth in claim 28, wherein said microcode execution unit comprises a selection operation for selecting a descriptor based on said segment selector, said segment block further comprising:

fault logic coupled to said microcode execution unit and said segment block for determining whether a protection fault occurs for said segment load operation; and branch logic coupled to said microcode execution unit and said segment block for determining whether special handling is required.

30. The microprocessor as set forth in claim 28, wherein said plurality of conditional load operations in said microcode execution unit comprise a conditional load operation to load a local descriptor from a local descriptor table, and a conditional load operation to load a global descriptor from a global descriptor table.

31. The microprocessor as set forth in claim 28, wherein said segment register load operation is constructed to load a segment register base and selector fields when said microprocessor is operating in said real mode, and to load a segment register base, selector field, rights field and limit field when said microprocessor is operating in said protected mode and said virtual-8086 mode.

32. The microprocessor as set forth in claim 28, wherein said cancel operation in said microcode execution unit comprises an operation for examining a table indicator (TI) bit in a selector in a selector and a null value associated with said segment selector, said operation being utilized to cancel said conditional load from said local descriptor table when said TI bit indicates selection of a global descriptor, to cancel said conditional load from said global descriptor table when said TI bit indicates selection of a local descriptor, to cancel said conditional load from said local descriptor table and from said global descriptor table when said null bit indicates a null selector, and to cancel said conditional load from said local descriptor table and from said global descriptor table when a limit violation occurs or when in real or virtual 8086 modes.

33. The microprocessor as set forth in claim 32, wherein said cancel operation in said microcode execution unit further comprises a plurality of cancel flags and an operation for setting a first cancel flag and returning undefined data for the load to cancel said conditional load operation issued to said local descriptor table when said TI bit indicates selection of a global descriptor, for setting a second cancel flag and returning undefined data for the load to cancel said conditional load issued to said global descriptor table when said TI bit indicates selection of a local descriptor, and for setting said first and second cancel flags and returning undefined dta for the loads to cancel said conditional load issued to said local descriptor table and said global descriptor table, respectively, when said null bit indicates a null selector, when said limit violation occurs, or when in real or virtual 8086 mode.

34. The microprocessor as set forth in claim 29, wherein said microcode execution unit comprises a selection operation for selecting a descriptor loaded in a temporary register, said selection operation being constructed to examine said first and second cancel flags when said microprocessor is operating in protected mode, to select a descriptor loaded based on said first and second cancel flags when said microprocessor is operating in protected mode, and to select any descriptor when said microprocessor is operating in said real and virtual-8086 mode.

35. The microprocessor as set forth in claim 29, wherein said fault logic comprises a fault programmable logic array (PLA) for checking whether said segment selector and descriptor loaded are valid, said microcode execution unit being constructed to disable said fault PLA when said microprocessor is operating in real or virtual-8086 mode and to input said segment selector, including privilege levels, and descriptor loaded into said PLA, said fault PLA being constructed to generate signals indicating a violation type and error code when an invalid segment selector and descriptor are detected.

36. The microprocessor as set forth in claim 29, wherein said branch logic comprises branch programmable logic array (PLA) for detecting special descriptor handling requirements for loading said segment register, said microcode execution unit being constructed to disable said branch PLA when said microprocessor is operating in real or virtual-8086 mode, and said branch PLA being constructed to set a flag for conditionally branching to a microcode handler routine if said descriptor requires special handling, and to generate a microcode address that identifies said microcode handler routine if said descriptor requires special handling.

37. The microprocessor as set forth in claim 29, wherein said microcode execution unit further comprises an operation to set a state bit to prevent subsequent operations from modifying said segment register when an invalid segment is detected or special descriptor handling is required until said micro-code execution unit recognizes said invalid segment condition or branches to said special descriptor handler.

38. The microprocessor as set forth in claim 30, wherein said conditional load operation which loads a global descriptor from a global descriptor table is further constructed to transfer said selector to one of said temporary registers, to determine whether said selector is a null selector, to determine whether a selector index, located within said selector, specifies a descriptor located beyond a global descriptor table limit, to signal a general protection fault when said selector index specifies a descriptor located beyond said global descriptor table limit, and to load said global descriptor from said global descriptor table when said selector index indicates a descriptor located within said global descriptor table limit and said selector is not a null selector when said microprocessor is operating in said protected mode.

39. The microprocessor as set forth in claim 34, wherein said conditional load operation which loads a local descriptor from a local descriptor table is further constructed to store a selector in a temporary register, to determine whether a selector index, located within said segment selector, specifies a descriptor located beyond a local descriptor table limit, to signal a general protection fault when said selector index specifies a descriptor located beyond said local descriptor table limit, and to load said local descriptor from said local descriptor table when said selector index indicates a descriptor located within said local descriptor table limit when said microprocessor is operating in said real or virtual-8086 mode.

* * * * *